May 23, 1939.  A. WEINER  2,159,066
BEAD MAKING MACHINE
Filed April 19, 1937  4 Sheets-Sheet 1
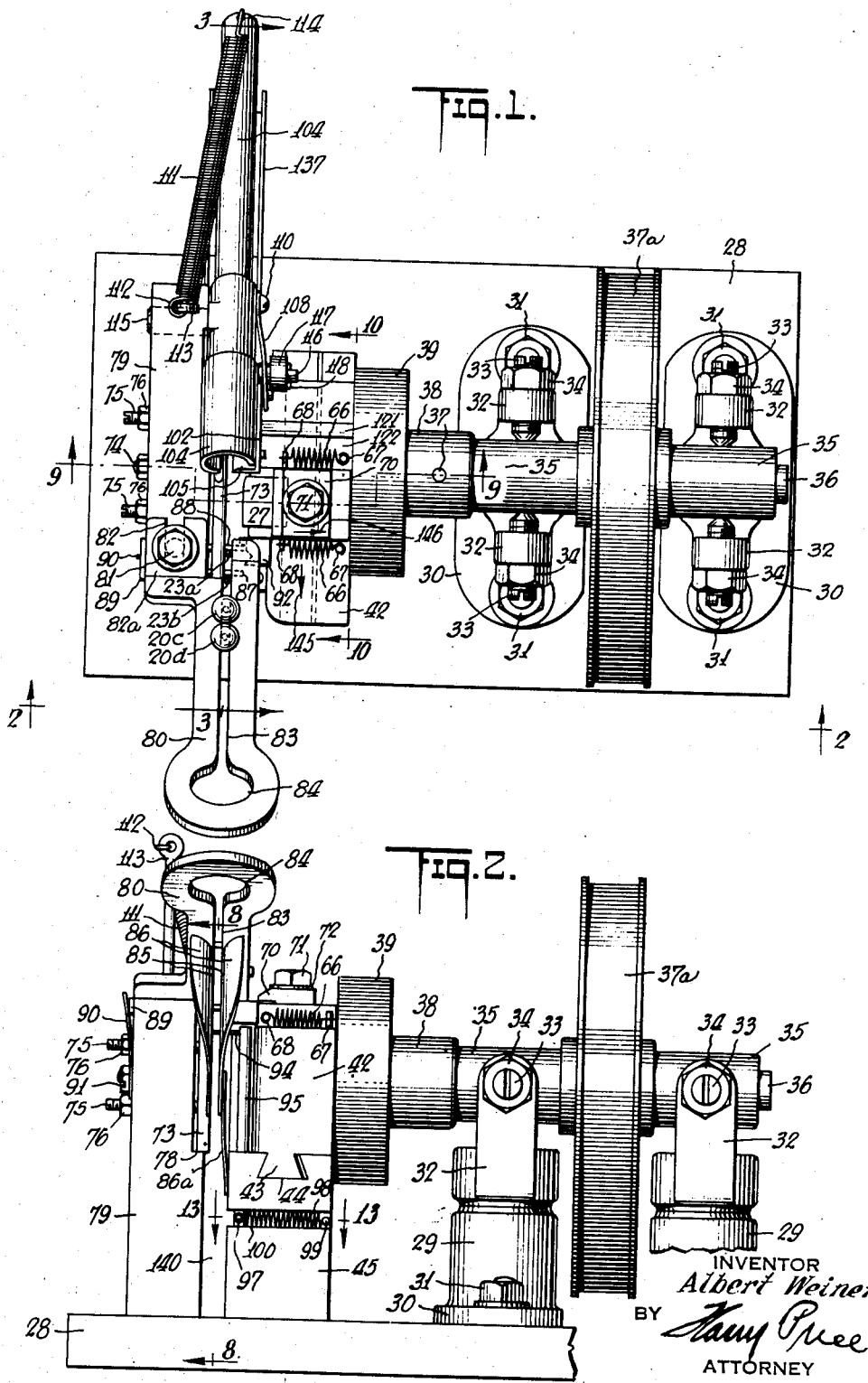
INVENTOR
Albert Weiner
BY
Harry Price
ATTORNEY May 23, 1939. A. WEINER 2,159,066
BEAD-MAKING MACHINE
Filed April 19, 1937 4 Sheets-Sheet 2
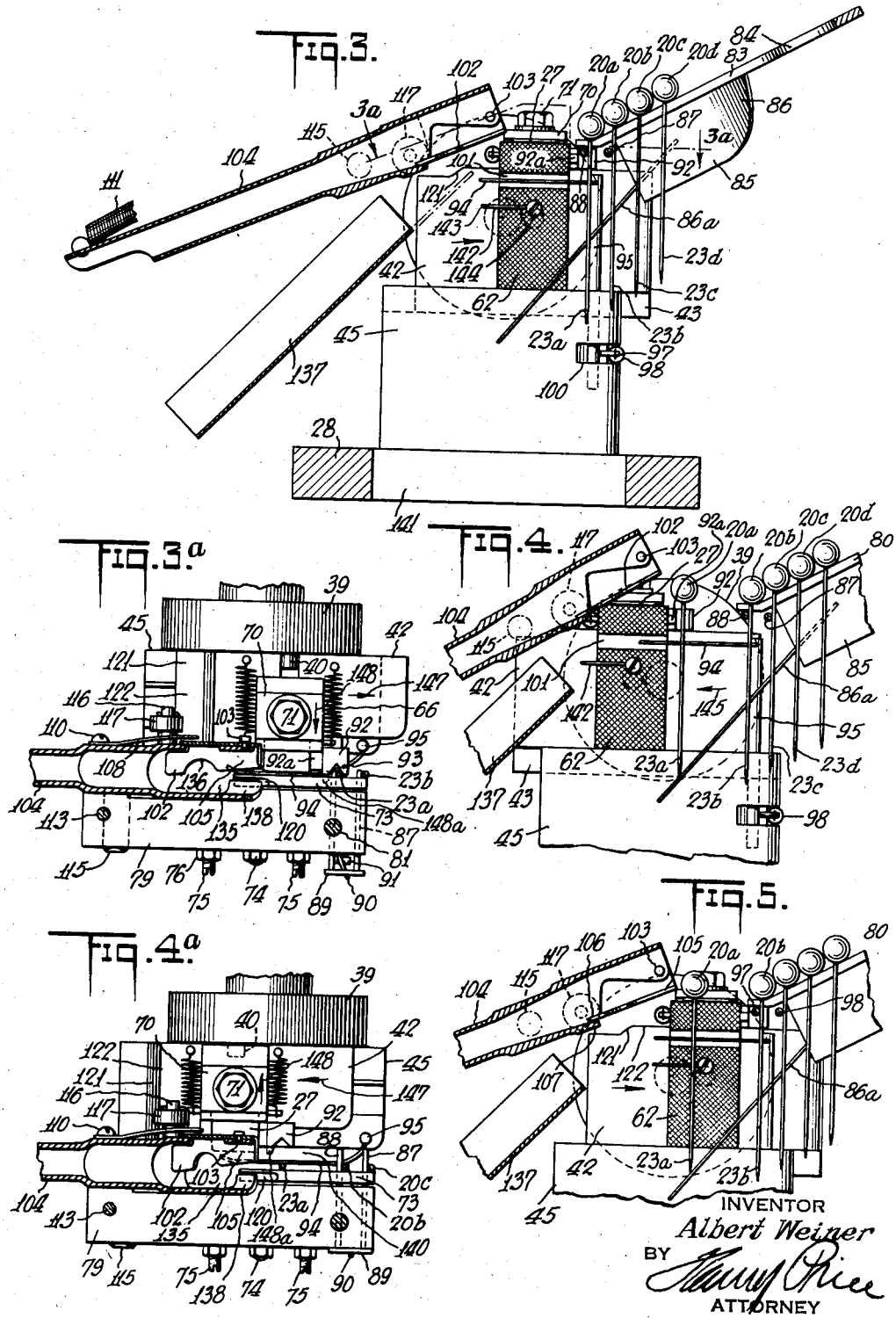
INVENTOR
Albert Weiner
BY
ATTORNEY

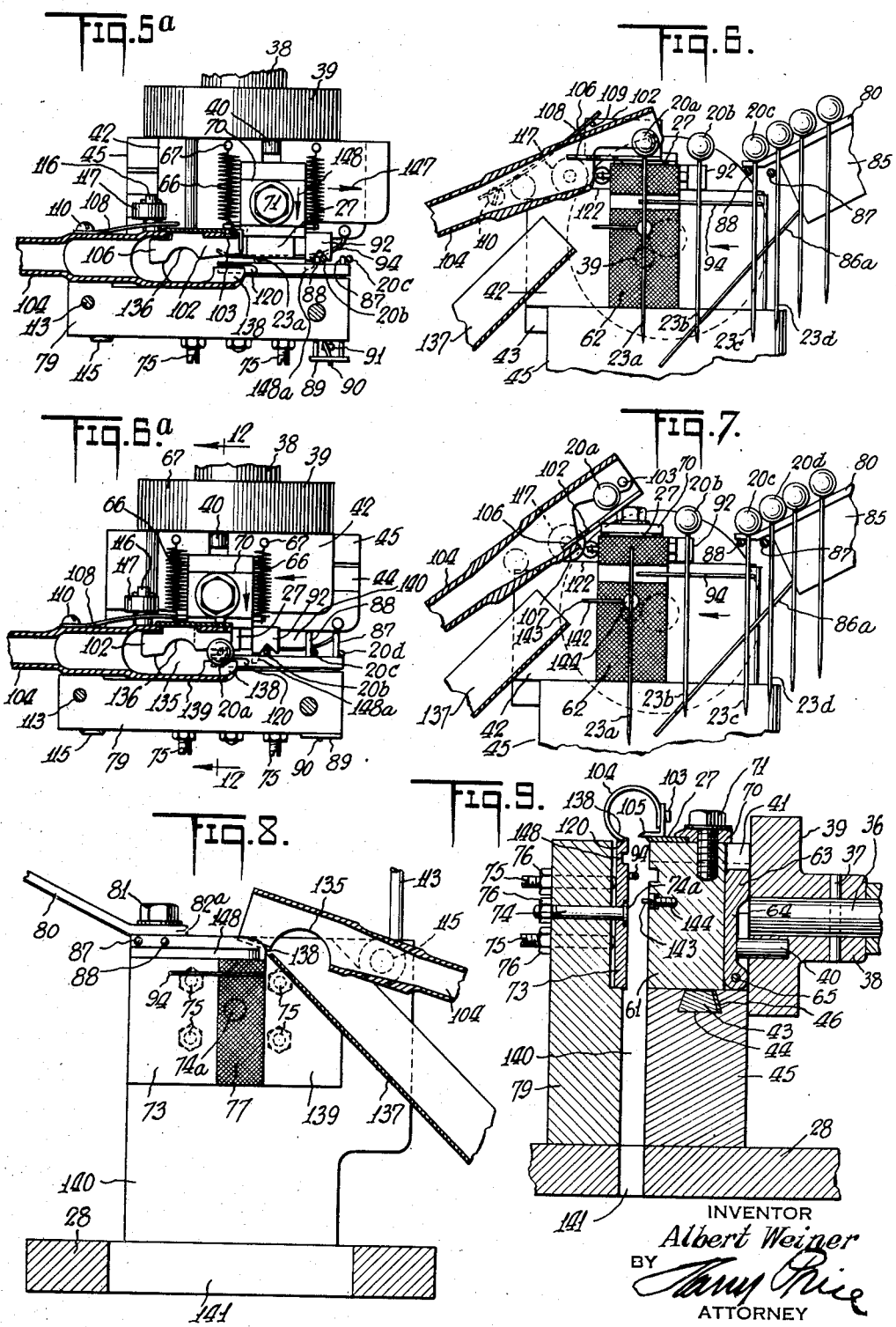

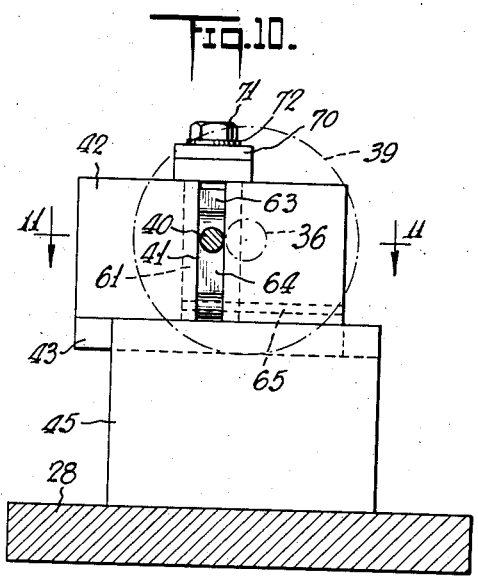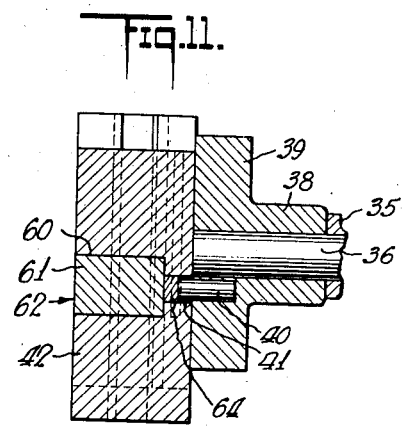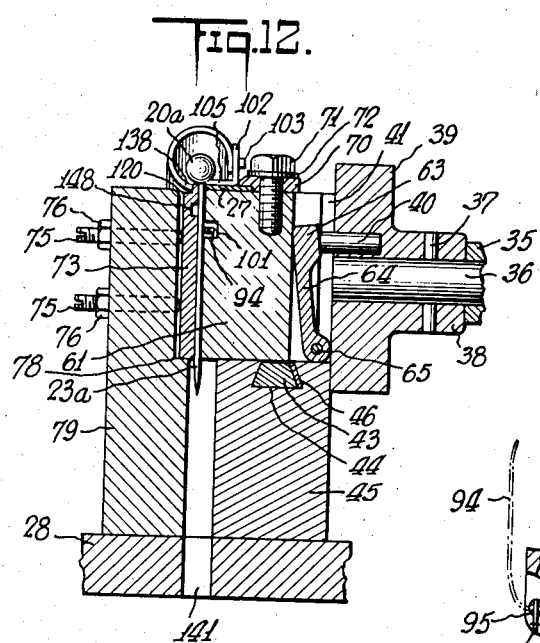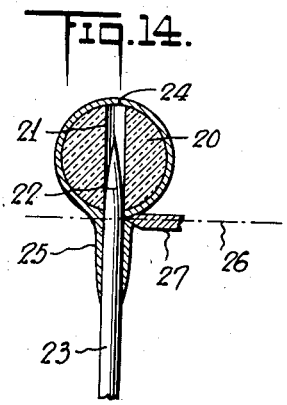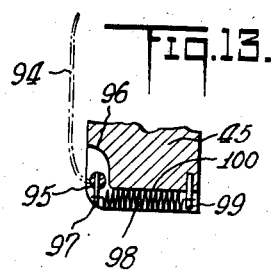

Patented May 23, 1939

2,159,066

UNITED STATES PATENT OFFICE 2,159,066

BEAD MAKING MACHINE

Albert Weiner, Providence, R. I.

Application April 19, 1937, Serial No. 137,761

23 Claims. (Cl. 164—47)

The present invention relates to a bead making machine and particularly in relation to a machine for cutting off coated beads or "synthetic pearls" from wires or holders utilized in the manufacture thereof.

In the process of manufacturing coated beads or "synthetic pearls", spherical glass bases, which may be hollow or solid, are provided with axial openings into which is inserted a tapered pin pointed at both ends. When the beads have been thus mounted upon pins, the other ends of the pins are mounted upon a holding board or frame, permitting the beads to be dipped in suitable coloring and coating solutions, such as solutions of cellulose derivatives containing fish scale materials and so forth. These various solutions, lacquer or varnishes, give a tough adherent coating which also covers the supporting pin adjacent point of attachment to the pin.

In removing the coated bead from the pin, it is necessary that the coating be cut or severed at the bottom of the bead without at the same time injuring the coating upon the bead and without causing chipping, breaking or tearing of such coating.

Normally this is accomplished by skilled female workers with knives who must run their knives around the base of the bead to sever the coating. Not only does this operation require a great deal of skill to prevent injury to the coating on the bead, but in addition, women operators are subject to injury due to the necessity of utilizing relatively sharp knives and holding them quite close to their hands during the cutting operation. Furthermore the beads produced will not usually be cut or severed from the pin in a uniform fashion even though a highly trained operator be used who has been trained for a long period of time.

It is therefore among the object of the present invention to provide an improved mechanism and method of severing coating beads or "synthetic pearls" from mounting wires or pins as above described which may be accomplished automatically to produce a high quality bead and without need of utilizing highly skilled labor and subjecting the operators to injury.

Other objects will be obvious or will be apparent during the course of the following specification, accomplishing the objects.

In accomplishing the above objects it has been found most suitable to provide a cutting device which will cut the coating at the pre-determined position at the junction of the bead and mounting pin.

In the preferred construction the mounting pin is caused to roll between two relatively moving corrugated jaws and the knife is positioned adjacent the base of the bead to press against such coating and sever the same as the pin is rolled.

The beads with pins attached are caused to slide down through a downwardly inclined slotted runway, are held in position by a gate and then one unsevered bead after another is fed to the cutting device.

The pin may be first advanced to cutting position from the gate element by a reciprocating jaw carrying a knife and upon the next forward reciprocation of feed jaw the bead is severed from the pin and the two are separated.

In severance, the bead is lifted from the pin by a lifting jaw and the bead and pin are both caused to fall through separate chutes to places of disposal.

In the drawings, which illustrate one of the forms of the present invention, to which however the invention is by no means restricted since many different embodiments and structures could be utilized all within the scope of the present invention:

Fig. 1 is a top view of one form of mechanism according to the present invention showing the stand, the pulley and several of the beads in position in the runway of the machine.

Fig. 2 is a front view upon the line 2—2 of Fig. 1.

Fig. 3 is a transverse sectional view upon the line 3—3 of Fig. 1.

Fig. 3a is a top view and partial section upon the line 3a—3a of Fig. 3.

Figs. 4 and 4a correspond to Figs. 3 and 3a except that the bead to be severed is shown in advanced position where it is held until the severing knife is applied.

Figs. 5 and 5a, corresponding respectively to Figs. 3 and 3a, and Figs. 4 and 4a, show the next position of the bead when the knife is severing the connection of the bead to the pin.

Figs. 6 and 6a, corresponding respectively to Figs. 5 and 5a, show the next successive position, show the bead and pin during severance, and the next bead with pin attached in position to be advanced by the jaw members.

Fig. 7 is a view similar to Fig. 6, illustrating the next operation in which the pin and bead are separated and from which position the bead and pin are separately disposed of.

Fig. 8 is a fragmentary cross sectional view upon the line 8—8 of Fig. 2 showing the fixed jaw member and the various guideways to dispose of the pin and bead after separation.

Fig. 9 is a fragmentary transverse sectional view upon the line 9—9 of Fig. 1.

Fig. 10 is a transverse sectional view upon the line 10—10 of Fig. 1 showing the operation of the cam for moving the traversing jaw with the cutting knife toward or away from the fixed jaw.

Fig. 11 is a transverse sectional view upon the line 11—11 of Fig. 10.

Fig. 12 is a transverse sectional view upon the line 12—12 of Fig. 6a.

Fig. 13 is a fragmentary transverse sectional view upon the line 13—13 of Fig. 2.

Fig. 14 is a diagrammatical view upon an enlarged scale indicating the attachment of the pin to the bead and the manner in which the knife cuts the attachment to sever the bead from the pin.

Referring to Fig. 14, the bead 20 which may be of glass or of some other suitable construction and which may be hollow, instead of solid as shown, is provided with an axial bore 21, into which is inserted the tapered end 22 of a pin 23.

The other end of the pin (not shown) is also pointed or tapered as at 22, so that a number of the beads 20 after being wedged upon the pins 23 may be mounted upon a board and dipped together into a coating solution containing a resinous or cellulose lacquer or varnish with suitable coloring material or suspended matter.

After the beads have been given the desired number of coatings and dried, a film 24 as shown in Fig. 14 will be formed thereon, and the film extending as indicated 25 a short distance along the pin 23.

Now the bead 20 must be severed from the pin 23 and the coating 20 should be cut from the extension 25 along the line 26 so that the coating 24 will not be sliced away from the bead at the bottom thereof and so that there will not be a projection left on said coating corresponding to the upper portion of the coating sleeve 25.

As indicated, the cutting knife 27 should accurately cut the coating between the spherical portion 24 and the sleeve portion 25, so that the thickness of the coating at the bottom of the bead after severance will be substantially the same as the thickness of the coating on the remaining portion of the bead.

When the cutting is done in this fashion the bead 20 may be more readily removed and will be of highest quality and value and there will be no breakage or splitting of the coating at the bottom of the severed bead or "synthetic pearl".

As it is apparent this operation of severance as diagrammatically indicated in Fig. 14 must be carried with great exactitude as otherwise the coating 24 would be injured adjacent the bore 21 and it is desirable that it be carried with uniformity so that all of the beads will be of substantially the same size and weight.

It is further apparent that to do this by hand, most highly skilled operators are necessary and that a substantial amount of manual labor and tedious repetitious activity would be required.

It is for the purpose of accomplishing this automatically that the machine of Figs. 1 and 2 has been designed.

Referring to Figs. 1 and 2 the machine is provided with a base 28. Upon this base are the two bearing mounts 29 having flanges 30 bolted at 31 to the mount 28.

The bearing mounts 29 are provided with a clevis jaw 32 carrying the adjustment screws 33 locked in position by the lock nuts 34.

The inner ends of these screws 33 are tapered and fix the bearing sleeves 35 in proper position.

Bearing in the sleeves 35 is the shaft 36 to which is fixed the pulley 37a which may be conveniently driven by a belted connection from a motor (not shown).

The bearing construction as thus described may be considerably varied and the shaft 36 may be directly driven or driven in other manners than shown.

As shown in Figs. 1, 2, 9, and 11 the shaft 36 extends into and is pinned at 37 to a collar 38 which has an enlarged face 39 carrying the projecting pin 40. The pin 40 is received in a slot 41 in the traversing jaw carrier element 42 (see Figs. 9, 10, and 12).

The carrier element 42 as shown in Figs. 9 to 12 is provided at its lower face with a dovetail projection 43 which slides in a correspondingly shaped groove 44 in the mounting structure 45. The structure 45 is connected to the base plate 28.

The bearing shim 46 is provided to take up any slack or wear between the dovetail 43 and the groove 44.

The traversing carrier 42 is provided with a recess 60 (see Fig. 11), in which is received the reciprocating jaw member 61, the face of said jaw member being corrugated, as indicated at 62 in Figs. 3 to 7, all inclusive, to permit a firmer grip on the shank of a pin and bead combination.

The jaw member 61 is caused to reciprocate by the coaction of the pin 40 and the cam lever 63, which cam lever is provided with a recessed portion 64.

The lever is pivotally mounted at 65 (see Figs. 9 and 12) on the reciprocating carrier 42. As shown in Figs. 9 to 12 the pin not only rides in the slot 41, causing traversing movement of the carrier 42, but also rides over the face of the cam lever 63, causing reciprocating movement of the jaw 61.

The jaw is normally biased toward the flange 39 by the relatively heavy coil springs 66 (see Figs. 1 and 2), which are fixed at one side to the carrier 42 by the pins 67 and at the other side to the jaw member 61 by the pins 68.

As indicated in Figs. 9 to 11, when the pin 40 rides in the recess 64 of the lever 63, the springs 66 will retract the reciprocating jaw 61 into withdrawn position as indicated.

When as shown in Fig. 12 the pin 40 rides over the upper portion of the lever 63 above the recess 64, the reciprocating jaw 61 will be moved forwardly to grip the pin 23a as indicated in Fig. 12.

To the top of the jaw 61 (see Figs. 1, 9, 12, and 14) is attached a knife 27. This knife is clamped down on the top of the jaw 61 by the notched plate 70 (see Fig. 9) in the notched recess of which is received the rear end of the knife 27.

The bolt 71 together with its washer 72 (see Fig. 12) holds said clamping plate 70 down firmly against the reciprocating jaw 61. By loosening the bolt 71 it is readily possible to adjust the position of the knife 27 to a correct position for severing the bead 20 as indicated in Fig. 14.

The jaw member 61 in rolling the stem 23a against the edge of the knife 27 cooperates with a fixed jaw plate member 73 which is held in position by the pin 74 (see Fig. 9), having an enlarged head 74a. The plate 73 may be adjusted by the adjusting screws 75.

The adjusting screws 75 and the pin 74 may all be locked in adjusted position by the lock nuts 76. Ordinarily the jaw plate 73 is so adjusted in respect to the jaw 61 that when in position as indicated in the position of Fig. 12, the pin 23a will be rolled by the corrugated face 62 of the jaw 61 against the corrugated face 77 of the jaw plate 73 (see also Fig. 8). As indicated best in Fig. 9 the adjustable fixed jaw plate 73 is received in recess 78 in the mount 79 attached to the base plate 28.

Connected to the top of the mounting element 79 is the runway element 80 (see Figs. 1 and 2) by the bolt 81, which is received in the slot 82 of the extension 82a of said runway member 80.

The runway member is provided with a guideway 83 which begins in the enlarged opening 84, permitting the pins 23 of the bead combinations as shown in Fig. 4 to be readily placed in position therein as indicated in Figs. 1 and 2.

The plates 85 are positioned directly below the guideway 83 and are turned outwardly as indicated at 86 so as to form a ready entrance for the pins 23 and cause them to descend in proper alignment down the slot 83 in the runway element 80. The wire 86a attached to the outside of one of the plates 85 and extending downwardly between the blocks 45 and 79 also guides the movement of the pins 23 (see particularly Fig. 2).

The pins 23a, 23b, 23c, and 23d will normally be separated and spaced as indicated best in Fig. 3 by the beads 20a, 20b, 20c, and 20d, and the gate pins 87 and 88 (see Figs. 1 and 3) will control the feed of the bead combinations 20—23 to between the jaws 61 and 73.

The guideway or gate pins 87 and 88 as shown in Figs. 1 and 3a are mounted on a plate 89. The plate 89 is normally biased by the spring 90 so that said plate 89 will contact with the outer face of the mount 79 as indicated in Figs. 1 and 2.

The lower end of the spring 90 is held against the mounting bolck 79 by the screw element 91 (see Figs. 2 and 3a).

The pins 87 and 88 will normally locate one pin 23a just at the entrance to the opening 140 between the jaw elements 61 and 73 in position to be taken up and operated upon by said jaws. The next pin 23b will be located in reserve position with the other pins 23c, 23d and so forth up along the runway 83.

To advance the pins 23a, 23b, and 23c, the advancer element 92 is provided with a V-shaped slot 93 (see Fig. 3a) said advancer element at the extreme position of the reciprocating carrier 42 being positioned so that the recess 93 will be moved toward the plate 73 by movement of the jaw 62 to receive the pin 23a and at the same time to press the gate pin 88 inwardly (see the dotted line position in Fig. 1 and the solid line position in Fig. 3a) with the result that the pin 23a will be snapped over or advanced beyond the gateway pin 88 and the pin 23b will be permitted to move into position between the gateway pins 87 and 88.

The advancer 92 is attached to the upper portion of the reciprocating member 61 by the extension 92a as shown in Figs. 3, 3a and 4. The advancer is provided with a projection 148a which rides in the slot 148 in the jaw 73 (see Figs. 6a and 8).

The advancer element 92 as shown best in Figs. 3 and 4 will advance the pin 23a from the position of Fig. 3 to the position of Fig. 4 and then will be withdrawn by the operation of the pin 40 and the cam lever 63 (see Fig. 10), the pin 23a being retained in the position of Fig. 4 by the spring 94 which presses against the corrugated face 77 of the jaw 73 as indicated in Fig. 8.

As shown in Figs. 2 and 13, the spring 94 is mounted upon a vertical rod 95 which is pivotally mounted on the base 45 as shown also in Fig. 2. The rod 95 is provided with a pin 97 to which is attached one end of the biasing spring 98. The other end of the spring 98 being connected to the pin 99 fixed in the mount 45.

The recesses 96 and 100 receive the spring 98, the pin 97 and the lower end of the rod 95. This spring 98 in acting upon the pin 97 tends to bias the spring 94 against the corrugated face 77 of the jaw 73 and holds the pins 23 in the position of Fig. 4 after they have been advanced by the advancer 92 and before they have been taken up by the jaws 61 and 73 and acted upon by the knife 27.

The manner in which the pins 23a, 23b, and 23c are held against said corrugated face 77 in position to be acted upon by the corrugated face 62 is best indicated in Figs. 4a, 5a, and 6a.

Referring to Fig. 12 it will be noted that the corrugated face 62 is provided with a recess 101 which encloses the spring 94 when the pins 23a or 23b are being rolled along the corrugated face 77 by the corrugated face 62 and when the knife 27 is cutting into the junction between the coating 24 and its sleeve 25.

After cutting, the bead will be removed from the pin in the manner indicated in Figs. 6 and 7.

The remover consists of an angle-shaped element 102 which is pivotally mounted at 103 upon the partial cylindrical element 104.

As indicated best in Figs. 6, 9 and 12, when the bead 20a is about to be separated from the pin 23a after severance with the knife 27, the bottom plate 105 of the angle plate 102 will be substantially at the flat against the knife 27 and its tapered inside edge will fit directly under the bottom of the bead 20a. In this position the angle member 102 will be pressed down so that its rear end 106 is elevated inside of the tubular member 104 (see Fig. 6).

This movement of the plate 102 on its pivot 103 will be against the tension of the spring 108 which presses against the pin 109 on the inside face of the vertical element of the angle 102 (see Fig. 6).

The other end of the spring 108 is held in position as shown in Figs. 1, 3a, 4a and so forth by the screw 110.

At this time the tubular element 104, carrying the angular element 102 will be elevated by the spring 111 (see Figs. 1 and 2). The spring 111 is connected at one end at 112 to a post 113 extending up from the amount 79 and at 114 at its other end to the rear end of the tubular element 104.

The tubular element 104 is mounted upon the pivot 115, which extends into a bore in the mounting structure 79. The element 104 will normally be biased downwardly at its forward end as shown in Figs. 3 and 8, when the carrier 42 and the jaw 61 are in their corresponding forward positions.

Projecting from the side of the tubular element 104 as shown best in Figs. 1, 3a, 4a, and so forth is a pin 116, upon which is positioned a roller 117 fixed thereon by the split pin 118.

The flange 105 will normally be held slightly above the knife 27 (see Figs. 1 and 3) when the carrier 42 is in forward position, the inside edge 138 of the forward end of the tubular element 104 being stopped in the recess 120 in the upper edge of the jaw element 73 (see Fig. 12).

However, as the reciprocating element 42 moves rearwardly, rolling the pin 23a against the knife 27, the sloping face 121 (see Fig. 5) will contact the roller 117, elevating said roller 117 as shown in Figs. 6 and 7 upon the elevated face 122 of said reciprocating jaw 42 (see Fig. 1 and also Figs. 6 and 7).

This operation will cause the flange 102 which has been inserted under the bead 20a to be elevated and to lift the bead 20a from the pin 23a as shown in Fig. 7, while at the same time, the spring 108 will move the flange 102 so that its end 106 will contact with the edge 107 at the forward end of the tubular element 104 as shown in Fig. 7.

To permit discharge of the severed bead, the forward end of the tubular element is provided with a recess 135 which cooperates with a recess 136 in the flange 102 (see Figs. 6a and 8), through which the severed bead 20a may drop into the chute 137 (see Figs. 7 and 8), a suitable receptacle (not shown) being positioned below the lower end of the chute 137 for collecting the severed beads.

During the bead elevating operation, as shown in Figs. 6, 6a and 7, the inturned edge 138 at the forward end of the tubular element 104 will hold the other side of the bead opposite the portion above the flange 102 permitting escape of said bead 20a only through said openings 135 and 136.

To release the severed pin 23a the block 79 is relieved at 139 and the withdrawal of the jaw 61 will permit said severed pin 23a to fall through the space 140 between the blocks 45 and 79 (see Fig. 9) and through the slot 141 in the bed plate 28. The pins may be collected in a suitable receptacle (not shown).

It will be noted that the plate 105, the inturned edge 138 and the chute 137 cooperate to separate the beads and the pins.

To make certain that the pins will be ejected after the position of Fig. 7, when the beads have been severed and removed, the wire 142 is provided (see Figs. 3 and 9). The wire 142 is attached by the screw 144 to the corrugated face 62 of the jaw 61 (see Figs. 3 and 9). This hook 143 will catch the pin 23a as it rolls beyond the jaw 77 and cause it to drop into the slot 140.

In operation the operator of the machine will place the bead and pin assemblies 20—23 in the slot or guideway 83 by making use of the opening 84 in the element 80.

The pulley 37a of Figs. 1 and 2 upon being rotated in the proper direction will cause the carrier 42 to move forwardly, with the jaw 61 retracted, as indicated by the arrows 145 and 146 of Fig. 1.

In Fig. 1 the two assemblies 20a—23a and 20b—23b will be held against the pins 88 and 87 respectively, which position is indicated in side view in Fig. 3. At this point the pin 40, which has been riding in the recess 64 in the cam lever 63, will now move on to the elevated portion at the top of the cam portion 63 (see Fig. 12), causing the jaw 61 to move inwardly toward the jaw 73 and causing the advancer element 92 to press the pin 88 inwardly and grasp the assembly to be severed by its pin 23a, as indicated in Fig. 3a.

The inward movement of the gateway pin 88 will release the pin 23a, permitting the advancer to move it forwardly. At the same time pin 87 will be retracted by the plate 89, permitting the pin 23b to move off the inclined slideway 80 against the pin 88, when the advancer element 92 moves beyond said gate pins 87—88, as in the position indicated in Fig. 4a. In the position of Fig. 4a, the pins 23b and 23c will respectively take up the positions of pins 23a and 23b as shown in Figs. 1, 3 and 3a, each complete reciprocation of the carrier 42 in advancing one assembly 20—23.

The advancer element 92 will move the pin 23a as indicated in Figs. 4 and 4a to a position where the pin 23a will be placed at the beginning of the corrugated face 77 on the fixed jaw 73, the pin 23a being held in this position by the spring 94 as the jaw 61 is retracted and the carrier 42 is again advanced.

When the carrier 42 is then again moved to its foremost position and the jaw 61 moved outwardly as indicated by the arrows 147 and 148 of Fig. 5a respectively, the next pin 23b will be moved toward cutting position the advancer recess 93 as shown in Fig. 5a and the knife 27 will be pressed against the upper end of the pin 23a just below the bead 20a.

Then as the carrier 42 moves rearwardly carrying the jaw 61 and knife 27, the knife edge will cut the sleeve 25 as indicated in Fig. 14 below the bead 20, while the corrugated face 62 is rolling the pin 23a. This will continue as long as the pin 40, as shown in Fig. 12, rides over the elevated face of the cam lever 63.

As soon as the pin 23a has been completely turned against the knife 27, assuring complete severance of the sleeve 25, as shown on Fig. 14, the pin 40 will ride off the elevated portion of the cam lever 63, permitting the springs 66 to withdraw the jaw 61 into retracted position, as shown in Fig. 9.

In the meanwhile, the flange 105 at the bottom of the angle plate 102 has been inserted under the severed bead 20a, as indicated in Figs. 6 and 12, and as the jaw member 61 continues to move rearwardly the roller 117 will ride up the inclined face 121 on the elevated face 122 of the carrier 42, as shown best in Figs. 6 and 7.

This will cause lifting of the bead 20a from the pin 23a, permitting the bead to roll toward the recess 135—136 where it will drop into the chute 137.

At the same time the retraction of the jaw 61 will release the pin 23a, permitting it to drop through the opening 140 and the slot 141, as shown in Fig. 9.

The carrier 42 will then be advanced, carrying the jaw 61 with the advancer 92 and the knife 27 to the positions of Figs. 1 and 3a, where they will operate on the next pins 23b and 23c, respectively, the latter being advanced to the intermediate position of Fig. 6 and the former being operated on by the knife to cut the sleeve 25. Any pins 23 which may run beyond the jaws will be caught by the hook 143 and thus ejected without difficulty. The face of the jaw 73 will also be kept clean by the advancer projection 148a riding in the slot 148.

The position of the knife 27 may be readily adjusted by loosening the bolt 71. The jaw 73 may be readily adjusted by loosening the lock nuts 76 and adjusting the screws 75. The tension on the spring 94 may be readily adjusted by changing the spring 98 in Fig. 13.

The cut beads produced will be of uniform quality and the cutting will be done in such a fashion as not to result in injury to the covering 24 left upon the bead. The machine may be operated at high capacity by ordinary skilled labor without special training. If desired, a magazine might be provided automatically to feed the beads to the guideway 80 without the need of feeding the assemblies in a group at a time.

As shown the apparatus is relatively simple, is made of comparatively few parts and is readily subject to adjustment to accommodate different sizes of pins and beads. The apparatus is of relatively light weight, weighing conveniently around 50 lbs., and it may be operated for long periods of time without need for repair or replacement parts.

Other means than thrown may be utilized for lifting the beads from the pins 23 and the tubular element may take other forms than shown.

Many other changes could be effected in the particular features of process treatment disclosed, and in specific details thereof, without substantially departing from the invention intended to be defined in the claims, the specific description herein merely serving to illustrate certain elements by which, in one embodiment, the spirit of the invention may be effectuated.

What is claimed is:

1. A process of automatically cutting coated beads or synthetic pearls from pin holders therefor which comprises supplying the pin holders one at a time to a knife edge, applying the knife edge to the junction between the bead and the pin and rolling the pin holder against the knife edge and finally lifting the beads off the pins.

2. A process of automatically cutting coated beads or synthetic pearls from pin holders therefor which comprises feeding said articles to between two corrugated jaws, rolling the pins between the jaws and simultaneously applying a cutting device to said pins at the junctions of the pins and beads, and then lifting the cut beads off the pins.

3. A machine for automatically cutting coated beads or synthetic pearls from pin holders therefor which comprises a feeding device, a reciprocating cutting device, means for rolling said holders against said cutting device and means lifting said beads from said pins and for separately collecting said pins and beads.

4. A machine for automatically cutting coated beads or synthetic pearls from pin holders therefor which comprises means to roll the pin, means to apply a knife at the junction of the bead and pin, and means to separate the bead and pin.

5. A machine for automatically cutting coated beads or synthetic pearls from pin holders therefor which comprises means to roll and cut the bead from the pin including two reciprocating jaws, and a fixed jaw, one of said reciprocating jaws moving transversely to the other reciprocating jaw and being carried by the other reciprocating jaw and in turn carrying a cutting knife.

6. A machine for automatically cutting coated beads or synthetic pearls from pin holders therefor which comprises means to roll and cut the bead from the pin including two reciprocating jaws, and a fixed jaw, one of said reciprocating jaws moving transversely to the other reciprocating jaw and being carried by the other reciprocating jaw and in turn carrying a cutting knife and means actuated by the other reciprocating jaw to separate the severed bead from the pin.

7. A machine for automatically cutting coated beads or synthetic pearls from pin holders therefor which comprises means to roll and cut the bead from the pin including two reciprocating jaws, and a fixed jaw, one of said reciprocating jaws moving transversely to the other reciprocating jaw and being carried by the other reciprocating jaw and in turn carrying a cutting knife and means to feed said pins and beads before severance one by one between said fixed jaw and said other reciprocating jaw.

8. A machine for automatically cutting coated beads or synthetic pearls from pin holders therefor which comprises means to roll and cut the bead from the pin including two reciprocating jaws, and a fixed jaw, one of said reciprocating jaws moving transversely to the other reciprocating jaw and being carried by the other reciprocating jaw and in turn carrying a cutting knife and means to adjust said fixed and other reciprocating jaws in respect to each other.

9. A machine for automatically cutting coated beads or synthetic pearls from pin holders therefor which comprises means to roll and cut the bead from the pin including two reciprocating jaws, and a fixed jaw, one of said reciprocating jaws moving transversely to the other reciprocating jaw and being carried by the other reciprocating jaw and in turn carrying a cutting knife and means to feed said pins and beads before severance one by one between said fixed jaw and and said other reciprocating jaw, said last mentioned means including a locking gate actuated by said other jaw to permit passage of one of said pin and bead combinations at a time.

10. A severing machine comprising a fixed jaw member, a movable jaw member, a transversing jaw member carried by said movable jaw member, an actuator to move said movable jaw parallel to said fixed jaw member and said transversing jaw transversely to said movable and fixed jaw members, a gate to feed elements to be severed one at a time to between said movable and fixed jaws.

11. A cutting machine for removing coated beads from their pin mounts comprising a support, two blocks attached to said support and spaced to form a slot between said blocks, the inside faces of said blocks being shaped to grasp the pin, means to move one of said blocks in respect to the other, means to cut said beads from said pins during said movement and means to feed said pins one at a time into said slot.

12. A cutting machine for removing coated beads from their pin mounts comprising a support, two blocks attached to said support and spaced to form a slot between said blocks, the inside faces of said blocks being shaped to grasp the pin, means to move one of said blocks in respect to the other, means to cut said beads from said pins during said movement and means to feed said pins one at a time into said slot, said last mentioned means including an inclined slotted runway, a locking gate and means to operate said gate to permit one pin to pass at a time.

13. A machine for automatically cutting coated beads or synthetic pearls from pin holders therefor which comprises means to apply a cutting device at the junction of the bead and pin, means to cause said device to cut the bead circumferentially at said junction and means to separate the bead and pin.

14. A machine for cutting coated beads from pins carrying the same after coating of the beads carried on the pins in the making of synthetic pearls comprising means for separating the beads from the pins, and means for separately collecting the separated beads and pins.

15. A machine for cutting coated beads from pins carrying the same after coating of the beads carried on the pins in the making of synthetic pearls comprising means for separating the beads from the pins, means for feeding the pins carrying the beads one by one to said first mentioned means, and means for separately collecting the separated beads and pins.

16. A machine for cutting coated beads from pins carrying the same after coating of the beads carried on the pins in the making of synthetic pearls comprising means for separating the beads from the pins, including a cutting device and means to cause relative circumferential movement of said device and said pins to separate said coatings at the junctions of the beads and pins, and means for separately collecting the separated beads and pins.

17. A machine for cutting coated beads from pins carrying the same after coating of the beads carried on the pins in the making of synthetic pearls comprising means for separating the beads from the pins, including a reciprocating carrier device, means to feed the pins carrying the coated beads thereto one by one, said device including means to cut the beads from the pins, and means for separately collecting the separated beads and pins.

18. A machine for cutting coated beads from pins carrying the same after coating of the beads carried on the pins in the making of synthetic pearls comprising means for separating the beads from the pins, including a reciprocating carrier for said pins carrying the coated beads, a cutting device reciprocating transversely to said carrier, means to cause contact between said device and said pins carrying the coated beads on said pins and means to cause relative rotating movement between said pins and said cutting device when in contact.

19. A machine for cutting coated beads from pins carrying the same after coating of the beads carried on the pins in the making of synthetic pearls comprising means for separating the beads from the pins, including a reciprocating carrier for said pins carrying the coated beads, a cutting device reciprocating transversely to said carrier, means to cause contact between said device and said pins carrying the coated beads on said pins and fixed and reciprocating jaws, said reciprocating jaw moving with said carrier to cause relative rotating movement between said pins and said cutting device when in contact.

20. A machine for cutting coated beads from pins carrying the same after coating of the beads carried on the pins in the making of synthetic pearls comprising a magazine for said pins, a cutting mechanism, means for feeding said pins one at a time from said magazine to said mechanism and means for separately collecting the separated beads and pins.

21. A machine for cutting coated beads from pins carrying the same after coating of the beads carried on the pins in the making of synthetic pearls comprising a slideway carrying said pins, a reciprocating mechanism for carrying said pins one by one from said slideway and means for separating the beads and pins while being so carried.

22. A process of separating coated beads from pins carrying the same after coating of the beads carried on the pins which comprises rolling the pins, applying a cutter to the junction between the pins and beads while they are being rolled, and then pulling the beads and pins apart.

23. A process of separating coated beads from pins carrying the same after coating of the beads carried on the pins which comprises rolling the pins, applying a cutter to the junction between the pins and beads while they are being rolled, the pins being held in vertical position during the rolling and the cutter being moved with the pins while they are being rolled, and then pulling the beads and pins apart.

ALBERT WEINER.